Patented Nov. 7, 1922.

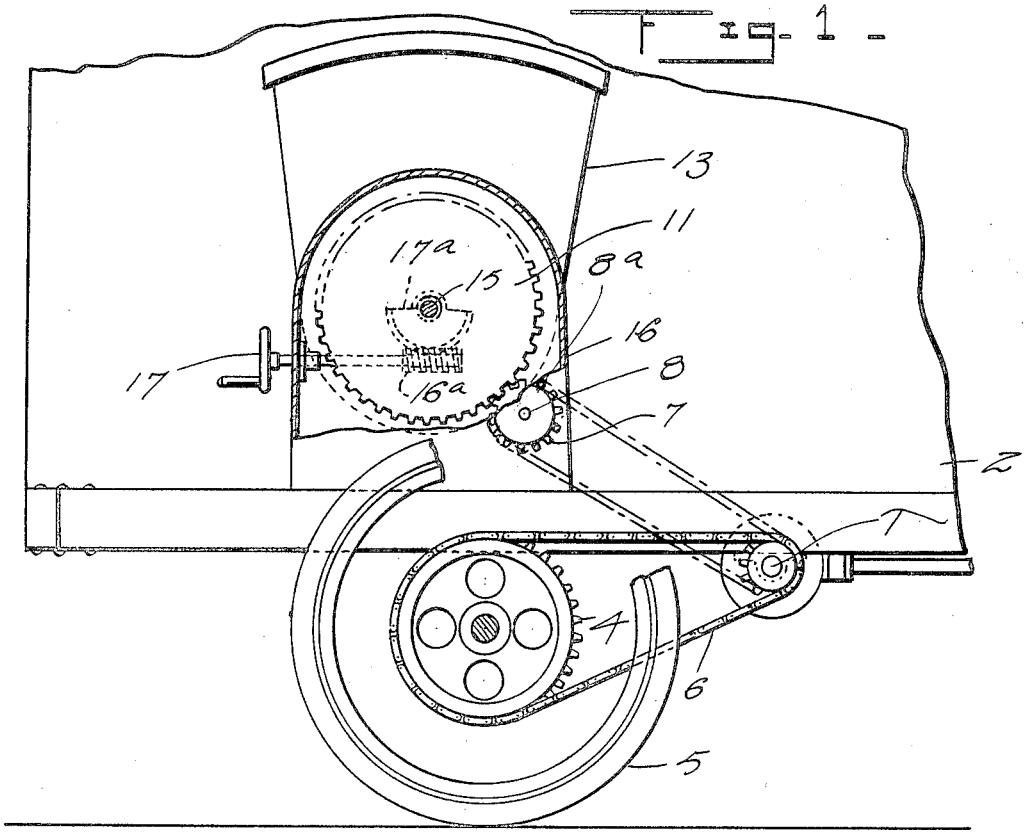
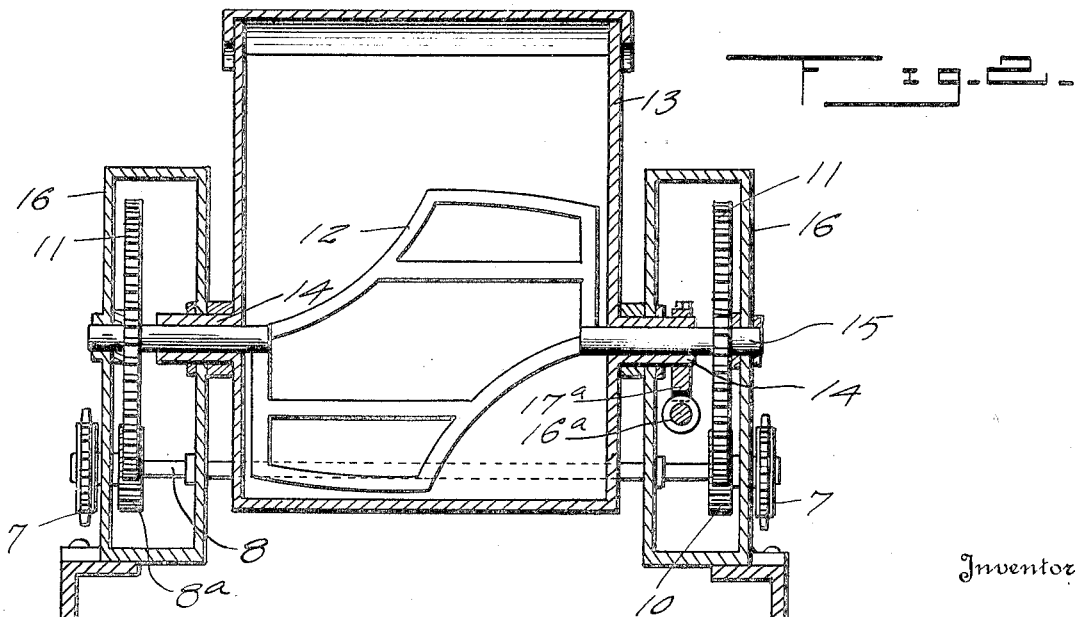

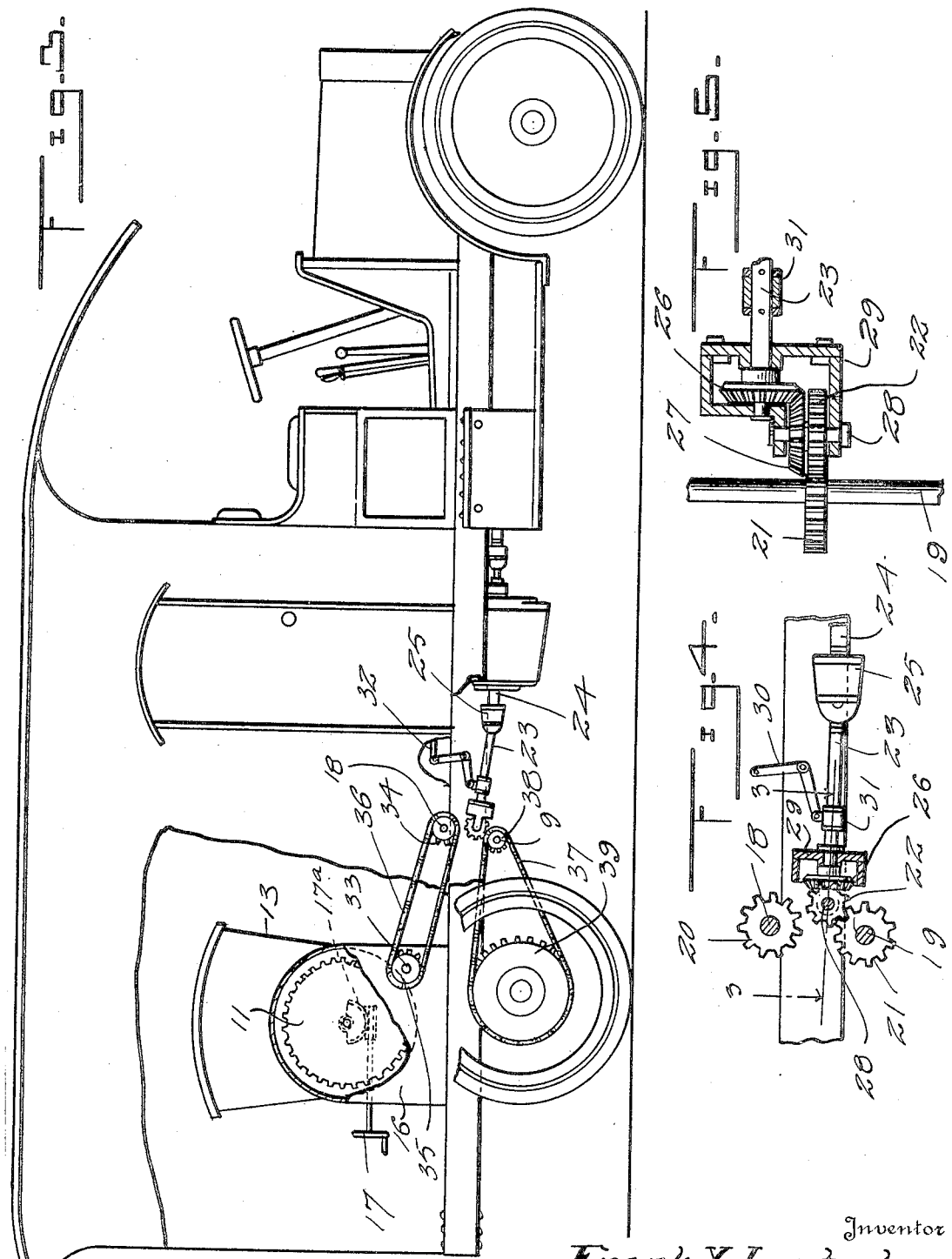

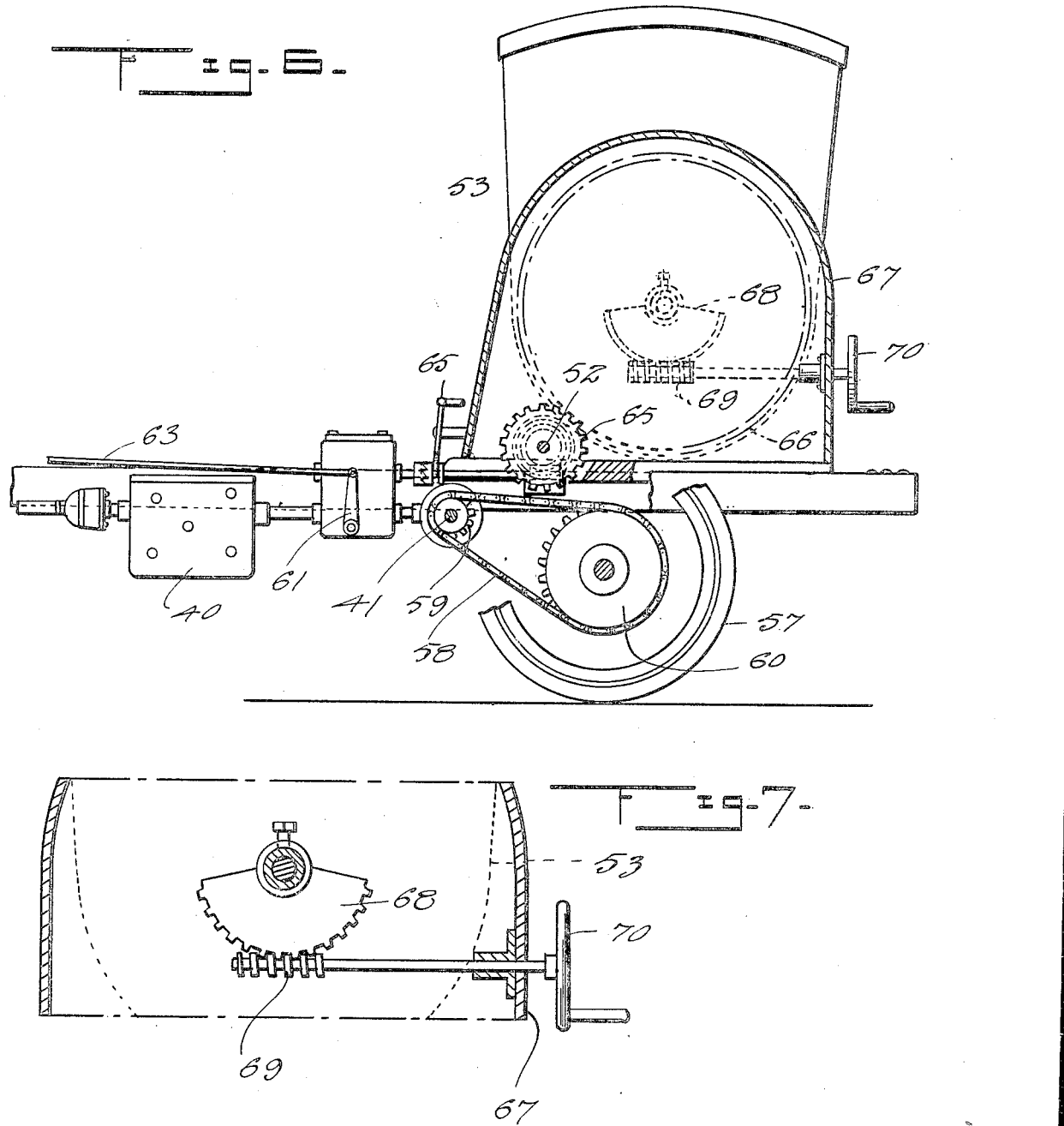

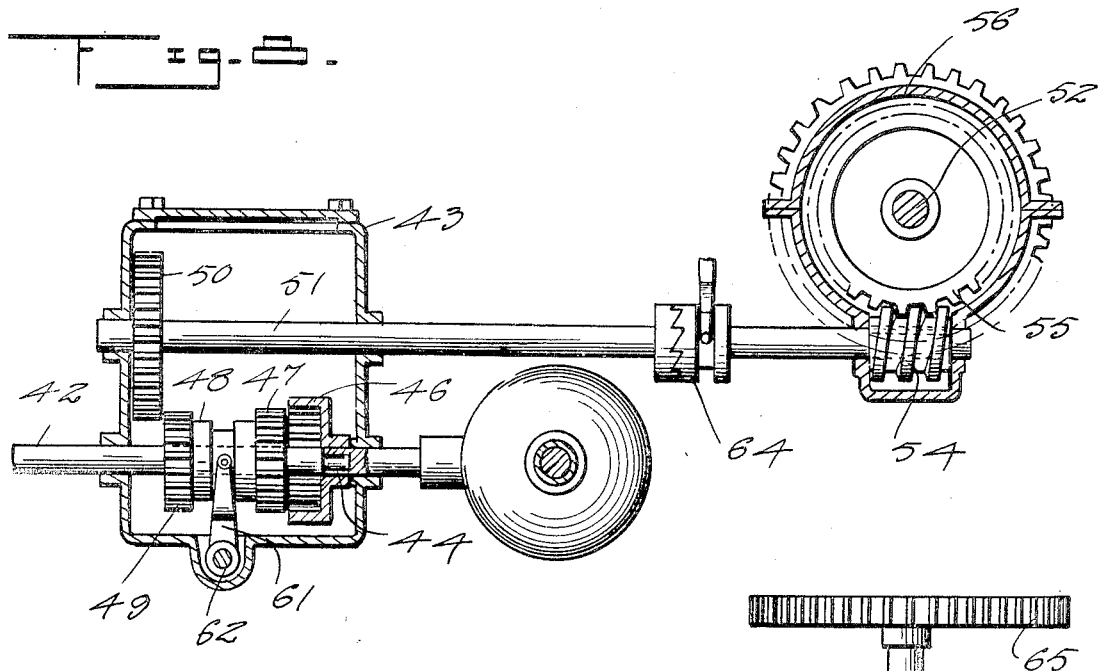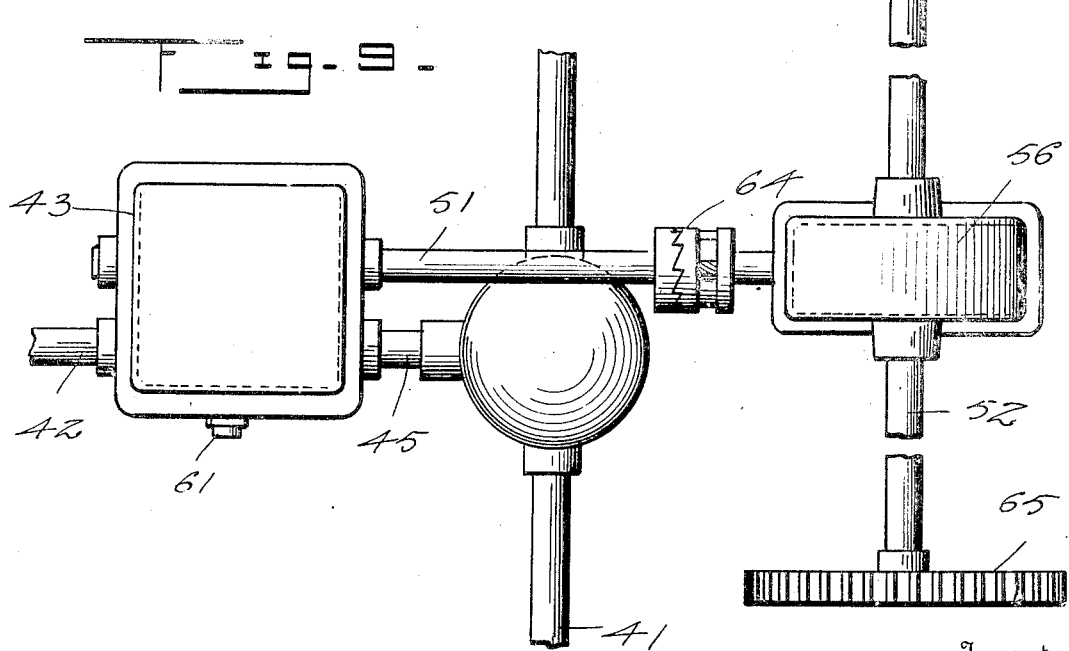

1,434,617

UNITED STATES PATENT OFFICE.

FRANK X. LAUTERBUR, OF SIDNEY, OHIO.

PORTABLE DOUGH MIXER.

Application filed October 16, 1917. Serial No. 196,835.

*To all whom it may concern:*

Be it known that I, FRANK X. LAUTERBUR, a citizen of the United States, residing at Sidney, in the county of Shelby and State of Ohio, have invented certain new and useful Improvements in Portable Dough Mixers, of which the following is a specification.

The invention relates to a portable dough mixer.

The object of the present invention is to provide a simple practical and efficient construction for equipping a motor truck with a dough mixer and for enabling the latter, when it has reached the desired place to be connected with and actuated by the engine or motor of the truck and its operation controlled by the clutch and the gear shift mechanism of the motor truck, whereby the dough mixer may be started, run at the desired speed, stopped and reversed by the controlling means of the truck, and also stopped and started without stopping the engine or motor of the truck.

It is also an object of the invention to provide a portable dough mixer of this character, in which the bowl of the dough mixer will be arranged to dump over and discharge beyond the truck to enable the dough to be conveniently and expeditiously handled in removing the same from the mixer.

The invention also has for its object to enable the power of the truck to be employed for operating other devices than the mixer when required.

With these and other objects in view, the invention consists in the construction and novel combination and arrangement of parts, hereinafter fully described, illustrated in the accompanying drawing and pointed out in the claims hereto appended, it being understood that various changes in the form, size, proportion and minor details of construction, within the scope of the claims, may be resorted to without departing from the spirit or sacrificing any of the advantages of the invention.

In the drawings:

Figure 1 is a side elevation partly in section showing a portable dough mixer constructed in accordance with this invention;

Fig. 2 is a transverse sectional view of the same;

Fig. 3 is a side elevation of a motor truck partly broken away illustrating another embodiment of the invention;

Fig. 4 is a detail longitudinal sectional view illustrating the gearing for connecting the power shaft with either the upper or lower jack shaft of the truck;

Fig. 5 is a detail horizontal sectional view of the same;

Fig. 6 is a side elevation partly broken away showing another form of the portable dough mixer;

Fig. 7 is a detail view of the dumping mechanism;

Fig. 8 is a longitudinal sectional view of the mechanism for connecting the main drive shaft with the mixer drive shaft or the jack shaft of the truck; and Fig. 9 is a plan view of the same.

Like numerals of reference designate corresponding parts in all the figures of the drawings.

In the Figures 1 and 2 of the accompanying drawings in which is illustrated one embodiment of the invention, 1 designates the transverse jack or power shaft of a motor truck 2 of any preferred construction, and equipped with any desired type of engine or motor and controlling mechanism, and as these instrumentalities are of the usual well known construction illustration and description thereof are deemed unnecessary. The shaft 1 is equipped at its ends with sprocket pinions 3, which are connected with sprocket wheels 4 of the rear drive wheels 5 of the motor truck by sprocket chains 6, adapted after the motor truck has been driven to the desired place, to be disconnected and removed from the sprockets 4 of the rear wheels 5 and placed upon sprocket wheels 7 of a cross shaft 8 of a dough mixer 8ᵃ or extra chains used for the purpose. The mixer cross shaft 8, which is journaled in suitable bearings of the motor truck, is shown arranged at the back of the mixer and above the horizontal plane of the rear axle 9 of the motor truck, but it may be arranged at any other convenient point and it is provided at its ends with spur pinions 10, which mesh with large side gear wheels 11 of the mixer arm or agitator 12 of the dough mixer 8ᵃ. Any preferred type of dough mixer may be employed.

The agitator 12 operates within a dumping bowl 13 provided with hollow trunnions 14, through which pass journals 15 of the shaft of the agitator of the dough mixer. The hollow trunnions 14 are journaled on and extend into hollow columns 16, which are suitably mounted upon the frame of the motor truck at opposite sides of the rear thereof over the rear axle 9 or at any other convenient point. Suitable dumping mechanism for the tilting of the bowl is connected with one of the hollow trunnions and has its hand or dump wheel 17 preferably located at the back of the hollow column 16 adjacent to the rear end of the truck. This dumping mechanism which preferably comprises a worm 16a and section 17a, will enable the bowl to be conveniently dumped from the rear end of the motor truck and the bowl which swings in a direction longitudinally of the truck is adapted to dump over the rear end of the same, but it may be arranged in any other desired position on the truck, such as transversely of the same. Instead of employing a chain drive various other forms of gearing may be used for transmitting motion from the transverse or jack shaft of the truck to the mixer cross shaft and the spur gearing; which is shown at the outer side of the chain drive may be located at the inner side of the same when a narrower mixer than that shown is used.

In Figures 3 to 5, inclusive, of the drawing is illustrated another embodiment of the invention in which the motor truck is equipped with upper and lower transverse or jack shafts 18 and 19 carrying spur gears 20 and 21, which are adapted to mesh with a pinion 22, carried by an auxiliary vertically movable longitudinal drive or power shaft 23. This auxiliary power shaft 23, which is connected with the main longitudinal drive or power shaft 24 of the truck by a suitable joint 25, transmits its rotary motion to the spur pinion 22 by means of bevel gears 26 and 27, the bevel gear 26 being fixed to the shaft 23 and the other bevel gear 27 being mounted upon a short shaft 28. A gear box or casing 29 is shown mounted upon the auxiliary shaft 23 for accommodating the gearing and supporting the shaft 28, but any other suitable means may be employed for connecting the pinion 22 with the shaft 23. The auxiliary longitudinal power shaft is raised and lowered by suitable operating mechanism comprising a bell crank lever 30 and a sliding sleeve 31. The sleeve 31 has a limited sliding movement on the shaft 23 and lever 30 is connected by a rod 32 with a suitable controlling lever located near the driver's seat, but any other suitable means may be employed for this purpose.

The upper jack shaft is connected with the mixer cross shaft 33 by sprocket gearing comprising sprocket pinions 34 and 35 and a sprocket chain 36, which is arranged on the said sprocket pinions 34 and 35. The sprocket pinion 34 is mounted on the upper cross shaft 18 and the sprocket pinion 35 is mounted on the mixer cross shaft 33. The lower cross shaft 19 is connected with the drive wheels of the truck by sprocket gearing consisting of a sprocket chain 37 arranged on a sprocket pinion 38 of the lower shaft 19 and a sprocket wheel 39 of the drive wheel.

When the controlling mechanism is operated to raise the shafe 23 the power of the truck is connected with the dough mixer for driving the same and when the said shaft 23 is swung downward it connects the power of the truck with the drive wheels and is dropped down to practically normal position. This construction provides a convenient and practical means of connecting either the mixer or the drive wheels of the truck with the power of the latter.

In Figures 6 to 9, inclusive, as illustrated, still another form of the invention in which transmission gear is interposed between the truck gear box 40 and the truck jack shaft 41 when the truck is a chain drive truck is shown, but the power may be connected to a worm, bevel or spur drive axle as will be readily understood. The main drive 42, which extends through the transmission gear box 43 is divided at 44 into front and rear sections, the rear section 45 being connected at the rear end with the truck jack shaft 41. The rear shaft section 45 has fixed to it at its front end an internal or female gear 46, which is adapted to mesh with a rear spur or male gear 47 of a sleeve 48 slidably interlocked with the front section of the main drive shaft by a key, squaring the shaft or the like. The sleeve 48 is equipped at its front end with a spur pinion 49, which is adapted to mesh with a spur gear wheel 50 of a longitudinal mixer drive shaft 51. The mixer drive shaft 51 passes through the gear box 43 and extends rearward therefrom to the cross-shaft 52 of the mixer 53 and is provided at its rear end with a worm 54 or gear, which meshes with the worm wheel 55 or gear, fixed to the mixer cross shaft 52. This gearing is housed within a suitable gear case 56. The truck jack shaft is connected with the drive wheels 57 by chain gearing consisting of a sprocket chain 58 meshing a sprocket pinion 59 of the jack shaft 41 and a sprocket wheel 60 of the drive wheel 57.

The sleeve 48 is operated by a shift lever 61 preferably in the form of a rock shaft and mounted in a central bearing 62 of the gear box 43 and connected by a rod 63 with a controlling lever located near the driver's seat. When it is desired to drive the truck in the ordinary manner the controlling lever is thrown into the proper notch and the sliding sleeve 48 will be moved rearward and the male gear 47 will be caried into mesh with the female gear 46 and establish a rigid continuous drive with no moving parts or interruption to the drive back of the jack shaft in the chain drive truck shown, or in a worm, spur, or bevel gear on any other type of shaft drive axle, which may be used. When it is desired to operate the mixer the controlling lever is operated to slide the sleeve 48 forward and the said sleeve is carried out of mesh with the female gear, into a neutral position and then into mesh with the spur gear 50 at the forward end of the mixer drive shaft 51. The mixer drive shaft 51 is shown equipped with a clutch 64, rigid jaw, friction, or any other form, which is operated by suitable controlling mechanism 65 adapted to be arranged so that the clutch 64 may be thrown by hand or foot from the back of the mixer to stop or start the latter independent of the starting or stopping of the motor of the truck. The clutch 64 will enable power to be easily transmitted from the mixer drive shaft 51 to the forward part of the truck to drive any other machine or mechanism, such as a kitchen machine.

While worm gearing is shown for connecting the shaft 51 with the mixer cross-shaft it will be understood that any other form of gearing may be used. The base of the mixer 53 is mounted upon the truck frame and the gear 65 of the mixer cross-shaft meshes with the large gear 66 and is arranged within a large cap 67. The bowl is dumped by dumping mechanism comprising a sector 68, worm 69 and a dump wheel 70 constructed and operating as heretofore described.

What is claimed is:

1. The combination of a wheeled frame, of a mixer including a transversely pivoted dumping receptacle mounted in fixed bearings at the rear end of the frame and arranged to tilt longitudinally thereof from an upright position over the frame to a projecting position with its top beyond the rear end of the frame, gearing having means for connecting it with either the mixer or the wheels of the frame for either propelling the latter or operating the mixer.

2. The combination of a wheeled frame, a mixer including spaced supports arranged at opposite sides of the frame, a pivoted receptacle mounted between the supports at the back of the frame and tiltable from an upright position over the frame to a projecting position at the rear end of the frame, an agitator operating within the receptacle, a mixer cross shaft extending across the space between the supports and arranged in parallelism with the axles of the frame, gearing connecting the cross shaft with the agitator, and means for connecting a motor either with the cross shaft of the mixer or with the wheels of the frame.

3. The combination of a wheeled frame, a mixer including spaced supports mounted upon the frame, a pivoted receptacle hung between the supports and normally arranged in an upright position above the frame and tiltable to a projecting position over the rear end of the frame, gearing for tilting the receptacle and for maintaining the same in a tilted projecting position, a horizontal cross shaft arranged in parallelism with the axles of the frame, an agitator operating within the receptacle, spur gears connecting the cross shaft with the agitator, and means including a chain drive for connecting a motor with either the cross shaft or the wheels of the frame.

4. The combination of a wheeled frame provided with drive wheels having sprocket wheels, said frame having a jack shaft provided with sprocket wheels, a mixer mounted upon the frame above the rear axle and tiltable to discharge its contents and provided with a cross shaft in parallelism with the axles of the frame having sprocket wheels, and chains connecting the sprocket wheels of the mixer cross shaft with the sprocket wheels of the jack shaft and adapted to be arranged on either the sprocket wheels of the cross shaft or on sprockets of drive wheels.

5. The combination of a wheeled frame having a chain drive including a jack shaft having sprocket wheels, drive wheels provided with sprocket wheels and detachable chains connecting the sprocket wheels, and a mixer mounted upon the back of the frame and tiltable to discharge its contents and having a cross shaft located above and in parallelism with the rear axle of the frame and provided with sprocket wheels adapted to receive the said chains when the same are detached from the drive wheels for connecting the mixer with the power of the frame.

6. The combination of a frame provided with drive wheels and having upper and lower jack shafts, a mixer mounted upon the frame above the rear axle and tiltable to discharge its contents, gearing connecting the jack shaft with the mixer and the drive wheels of the frame, upper and lower gears fixed to the jack shafts, a longitudinal drive shaft located in advance of the jack shafts, a gear connected with and carried by the longitudinal shaft, and means for moving the drive shaft upwardly and downwardly to carry the gear thereof into mesh with the gears of the jack shafts to connect either the mixer or the drive wheels with the drive shaft.

7. The combination of a frame having drive wheels and including a main drive shaft, a mixer drive shaft extending in rear of the main drive shaft, a mixer mounted upon the frame and geared to the mixer drive shaft, means for connecting the main drive shaft with either the mixer drive shaft or the drive wheels of the frame, said means comprising an internal gear mounted upon the rear section of the main drive shaft, a gear fixed to the mixer drive shaft, and a sleeve slidably interlocked with the front section of the main drive shaft and having gears movable into and out of mesh with the said gears, one of the gears being movable into and out of the internal gear.

8. The combination of a frame having drive wheels and including a main drive shaft, a mixer drive shaft, a mixer mounted upon the frame and geared to the mixer drive shaft, means for connecting the main drive shaft with either the mixer drive shaft or the drive wheels of the truck, said means comprising a gear box receiving the drive shaft, an internal gear fixed to the rear section of the main drive shaft, a gear fixed to the mixer drive shaft and spaced from the internal gear, a sleeve slidably interlocked with the front section of the main drive shaft and located in the gear box, and a shift lever operating in the gear box for moving the gear of the sleeve into and out of the internal gear of the said rear shaft section or into and out of mesh with the gear of the mixer drive shaft.

9. In a combined propelling and mixer operating means, the combination of a main longitudinal drive shaft composed of front and rear sections, gearing connected with the rear section of the drive shaft and actuated by the same for propelling a wheeled frame, an auxiliary longitudinal drive shaft extending in rear of the main drive shaft for operating a mixer, means for connecting the rear section of the main drive shaft with either the said gearing or the auxiliary longitudinal drive shaft, said means comprising an internal gear mounted upon the rear section of the main drive shaft, a gear fixed to the auxiliary drive shaft, a sleeve slidably interlocked with the front section of the main drive shaft and located in the gear box, and a shift lever operating in the gear box for moving the gear of the sleeve into mesh with either the internal gear of the said shaft section or the gear of the auxiliary drive shaft.

In testimony whereof I affix my signature in the presence of two witnesses.

FRANK X. LAUTERBUR.

Witnesses:
   J. J. SARVER,
   URBAN H. DOORLEY.